United States Patent
Liu et al.

(10) Patent No.: US 9,209,739 B2
(45) Date of Patent: Dec. 8, 2015

(54) BRUSHLESS MOTOR DEVICE CONTROLLED BY A CARRIER OF DC POSITIVE AND NEGATIVE POWER WIRES

(71) Applicants: Mei-Chun Liu, Taichung (TW); Hui-Yen Chu, Taichung (TW)

(72) Inventors: Mei-Chun Liu, Taichung (TW); Hui-Yen Chu, Taichung (TW)

( * ) Notice: Subject to any disclaimer, the term of this patent is extended or adjusted under 35 U.S.C. 154(b) by 185 days.

(21) Appl. No.: 13/777,497

(22) Filed: Feb. 26, 2013

(65) Prior Publication Data

US 2014/0239865 A1 Aug. 28, 2014

(51) Int. Cl.
| | | |
|---|---|---|
| *H02P 6/00* | (2006.01) | |
| *H02P 6/16* | (2006.01) | |
| *H02P 31/00* | (2006.01) | |
| H02P 6/18 | (2006.01) | |
| H02M 3/337 | (2006.01) | |
| H02P 6/06 | (2006.01) | |

(52) U.S. Cl.
CPC ............. *H02P 31/00* (2013.01); *H02M 3/3376* (2013.01); *H02P 6/06* (2013.01); *H02P 6/182* (2013.01)

(58) Field of Classification Search
CPC ........... H02P 31/00; H02P 6/182; H02P 6/06; H02M 3/3376

USPC ..................... 318/400.42, 400.07
See application file for complete search history.

(56) References Cited

U.S. PATENT DOCUMENTS

| 4,528,486 | A  | * | 7/1985  | Flaig et al.   | 318/400.21 |
|-----------|----|---|---------|----------------|------------|
| 4,546,293 | A  | * | 10/1985 | Peterson et al.| 318/400.14 |
| 4,823,056 | A  | * | 4/1989  | Watanabe et al.| 388/829    |
| 5,300,866 | A  | * | 4/1994  | Yasohara       | H02P 6/06  |
|           |    |   |         |                | 318/400.07 |
| 7,456,597 | B2 | * | 11/2008 | Kanamori       | 318/599    |
| 2005/0281545 | A1 | * | 12/2005 | Sugimoto et al.| 388/805 |
| 2006/0214611 | A1 | * | 9/2006  | Wang et al.    | 318/254 |
| 2011/0068723 | A1 | * | 3/2011  | Maiocchi       | 318/400.3 |
| 2012/0043930 | A1 | * | 2/2012  | Scudiere       | 320/108 |

* cited by examiner

*Primary Examiner* — Bentsu Ro
*Assistant Examiner* — Zemenay Truneh
(74) *Attorney, Agent, or Firm* — Ming Chow; Sinorica, LLC

(57) ABSTRACT

A brushless motor device controlled by a carrier of DC positive and negative power wires comprises a controller. The controller outputs a positive DC wire for outputting a positive DC voltage and a negative DC wire for outputting a negative DC voltage. The positive and negative DC voltages include a carrier signal. The controller is connected to a driver which is applied to receive the carrier signal and control a rotating mode of a brushless DC motor according to the carrier signal. Therefore, the carrier signal allows the driver and the controller to be connected by the positive and negative DC wires and attains the object of transmitting the signal, thereby reducing the material of the signal wire and the manufacture cost.

3 Claims, 4 Drawing Sheets

BRUSHLESS MOTOR DEVICE CONTROLLED BY A CARRIER OF DC POSITIVE AND NEGATIVE POWER WIRES

BACKGROUND OF THE INVENTION

1. Field of the Invention

The present invention relates to a brushless motor device controlled by a carrier of DC positive and negative power wires.

2. Description of the Related Art

Referring to FIG. 1, a block diagram of a conventional brushless DC motor control device discloses a conventional brushless DC motor control device. The brushless DC motor control device is connected to a brushless DC motor 200. The brushless DC motor control device comprises a controller 1 electrically connected to an external DC power for providing a demanded DC power. The controller 1 is applied to control a rotating mode of the brushless DC motor 200. The controller 1 outputs a positive DC wire, a negative DC wire 3 and a signal wire 4 respectively. The signal wire 4 is applied to transmit a signal which controls the rotating mode of the brushless DC motor 200. The controller 1 is connected to a driver 5 via the positive DC wire 2, the negative DC wire 3, and the signal wire 4. The driver 5 is applied to receive the signal transmitted by the signal wire 4 and control the rotating mode of the brushless DC motor 200 according to the signal transmitted by the signal wire 4. The driver 5 is applied to connect to the brushless DC motor 200.

The conventional brushless DC motor control device is applied to control the rotating mode of the brushless DC motor, which applies a three-linear structure to transmit the signal that controls the rotating mode of the brushless DC motor, whereby the material of the signal wire and the manufacture cost of the conventional brushless DC motor control device are increased. Therefore, the inventor of the present invention realized the mentioned disadvantages and considered that the conventional brushless DC motor control device could be improved, thereby presenting the present invention.

SUMMARY OF THE INVENTION

It is an object of the present invention to provide a brushless motor device controlled by a carrier of DC positive and negative power wires, which applies a positive DC voltage and a negative DC voltage to transmit the signal, so that the signal can be transmitted between the driver and the controller via the positive and negative wires. Therefore, the material of the signal wires and the manufacture cost are reduced.

For attaining the above-mentioned objects, the present invention provides a brushless motor device controlled by a carrier of DC positive and negative power wires which comprises a controller electrically connected to a DC power. The controller is applied to output a positive DC voltage and a negative DC voltage. The positive DC voltage includes a carrier signal. The controller is electrically connected to a driver. The driver and the controller are connected by a positive DC voltage and a negative DC voltage. The driver is applied to receive the carrier signal and control a rotating mode of a brushless DC motor according to the carrier signal.

The present invention provides a brushless motor device controlled by a carrier of DC positive and negative power wires, which applies the carrier signal transmitted from the positive DC voltage to control the rotating mode of the brushless DC motor, so that the signal can be transmitted between the driver and the controller via the positive and negative wires and the rotating mode of the brushless DC motor is controlled. Therefore, the material of the signal wires and the manufacture cost are reduced.

DETAILED DESCRIPTION OF THE PREFERRED EMBODIMENTS

Figure 1:
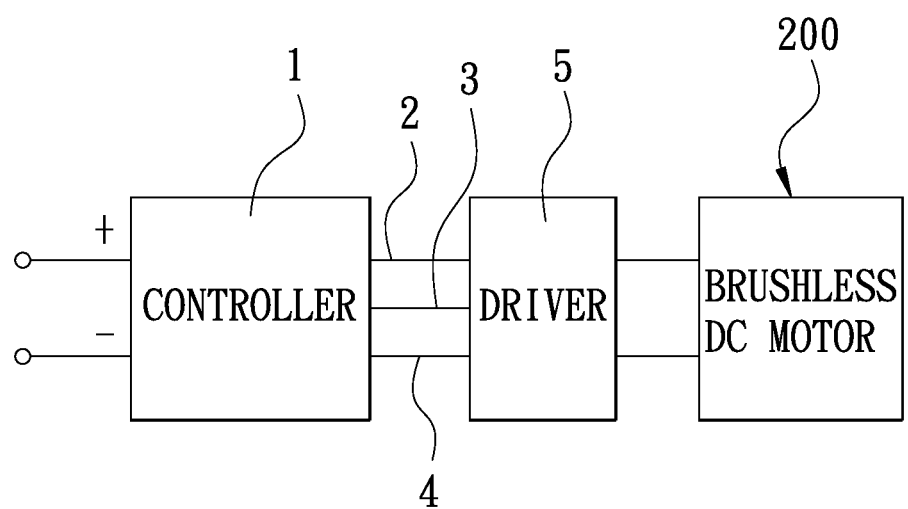
FIG. 1 is a block diagram showing a circuit of a conventional brushless DC motor control device.
Figure 2:
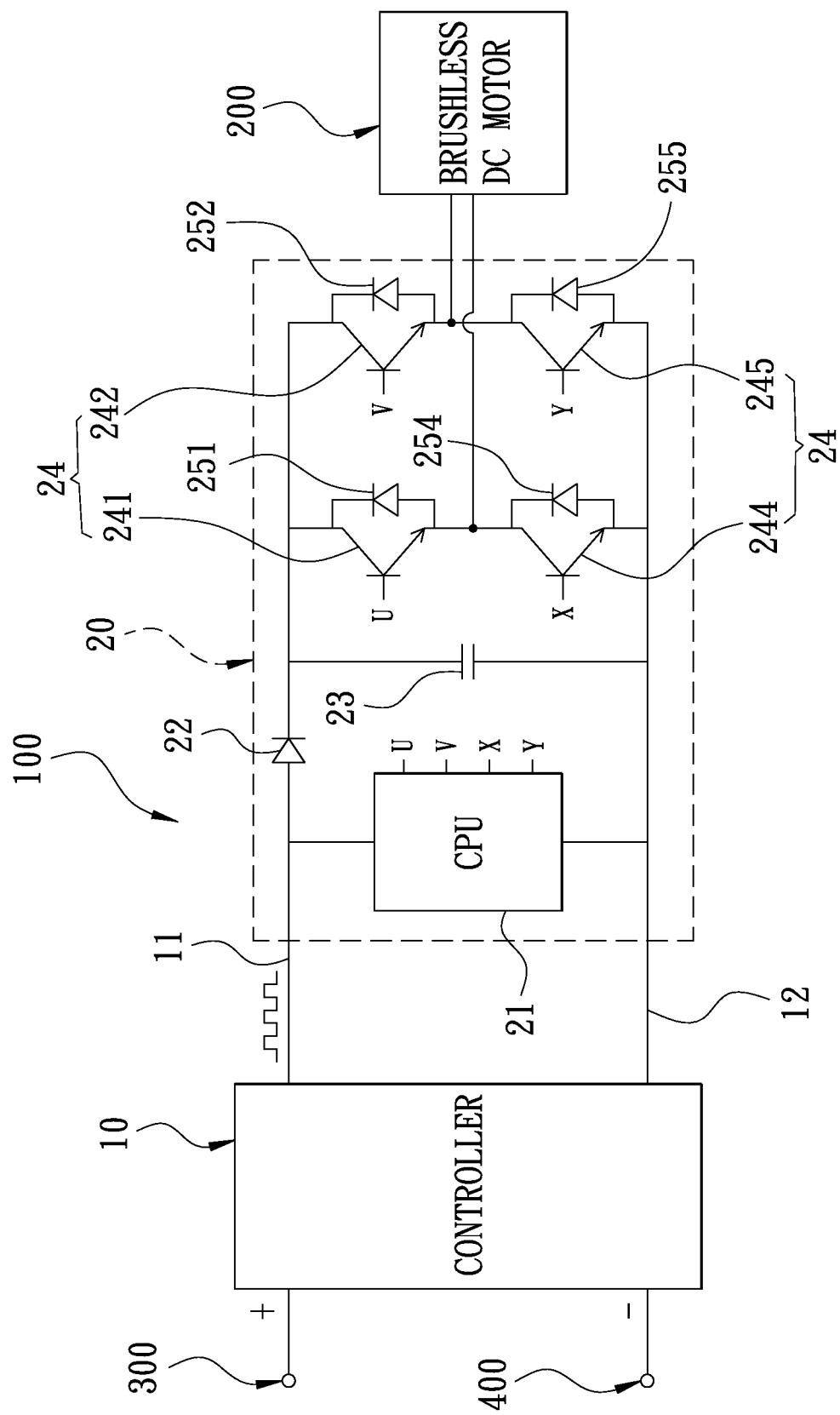
FIG. 2 is a block diagram showing a circuit of a first preferred embodiment of the present invention.

Referring to FIG. 2, a block diagram of a first preferred embodiment of the present invention discloses a brushless motor device 100 controlled by a carrier of DC positive and negative power wires. The brushless motor device 100 controlled by a carrier of DC positive and negative power wires is connected to a brushless DC motor 200. The brushless motor device 100 controlled by a carrier of DC positive and negative power wires comprises:

A controller 10 electrically connected to a DC power. The DC power outputs a positive electrode 300 and a negative electrode 400 and is connected to the controller for providing the demanded DC power. The controller 10 outputs a positive DC wire 11 for outputting a positive DC voltage and a negative DC wire 12 for outputting a negative DC voltage. One of the positive DC wire 11 and negative DC wires 12 includes a carrier signal, thereby controlling a rotating mode of the brushless DC motor 200.

A driver 20 electrically connected to the controller 10. The driver 20 and the controller 10 are electrically connected only by the positive DC wire 11 and the negative DC wire 12. The driver 20 is preferably connected to the brushless DC motor 200. The driver 20 includes a CPU 21. The CPU 21 is connected to the positive DC wire 11 and the negative DC wire 12 for receiving the carrier signal or saving and memorizing the carrier signal and controlling the rotating mode of the brushless DC motor 200. Furthermore, the driver 20 includes a unidirectional diode 22. The unidirectional diode 22 is disposed between the CPU 21 and the brushless DC motor 20 for interfering a counter-electromotive force generated from said brushless DC motor 200. The driver 20 further includes an electric capacity 23. The electric capacity 23 is disposed between the unidirectional diode 22 and the brushless DC motor 200 for stabilizing the voltage thereof. Moreover, the driver 20 includes a plurality of transistors 24. The transistors 24 are disposed between the unidirectional diode 22 and the brushless DC motor 200. The transistors 24 are respectively defined as a U-transistor 241, a V-transistor 242, an X-transistor 244, and a Y-transistor 245. The U-transistor 241 is series connected to the brushless DC motor 200 and then series connected to the Y-transistor 245. The V-transistor 242 is series connected to the brushless DC motor 200 and then series connected to the X-transistor 244. The U-transistor 241 is parallel connected to a U-unidirectional diode 251. The V-transistor 242 is parallel connected to a V-unidirectional diode 252. The X-transistor 244 is parallel connected to an X-unidirectional diode 254. The Y-transistor 245 is parallel connected to a Y-unidirectional diode 255.

Referring to FIG. 2, the controller 10 controls the rotating mode of the brushless DC motor 200 via the carrier signal output from the positive DC wire 11 and negative DC wire 12. The driver 20 receives the carrier signal and then reads the carrier signal via the CPU 21 for outputting a corresponding electric current. The electric current output from the driver 20 is applied to drive and control the rotating mode of the brushless DC motor 200. Therefore, the driver 20 and the controller 10 are connected only by the positive DC wire 11 and the negative DC wire 12, which attains the object of transmitting the signal so as to reduce the material of the signal wire and the manufacture cost. The positive DC wire 11 and negative DC wire 12 are not applied to the particular wires, but the general wires. Therefore, it is easy and convenient to get the material. Further, the cost of the brushless motor device 100 controlled by a carrier of DC positive and negative power wires is decreased.

Furthermore, the brushless motor device 100 controlled by a carrier of DC positive and negative power wires applies the unidirectional diode 22 to be series connected to the U-transistor 241. The U-transistor 241 is parallel connected to the U-unidirectional diode 251 and then connected to the brushless DC motor 200, and connected to the Y-transistor 245. The Y-transistor 245 is parallel connected to the Y-unidirectional diode 255. The unidirectional diode 22 is series connected to the V-transistor 242. The V-transistor 242 is parallel connected to the V-unidirectional diode 252 and then connected to the brushless DC motor 200, and connected to the X-transistor 244. The X-transistor 244 is parallel connected to the X-unidirectional diode 243. Therefore, the transistors 24 are operated by the CPU 21 which selects appropriate circuit parameters for controlling the rotating mode of the brushless DC motor 200.

Particularly, after the CPU 21 sets the function, the saving and memorizing function possessed by the CPU 21 can be used for setting the rotating mode of the brushless DC motor 200 without controlling the rotating mode of the brushless DC motor 200 via the carrier signal output from the controller 10, so that the driver 20 is electrically connected to the DC power. Preferably, the CPU 21 can be preset, and the controller 10 can be omitted.

Furthermore, the brushless motor device 100 controlled by a carrier DC positive and negative power wires is applied to combine with the brushless DC motor 200 in sale, thereby saving the fee, reducing the cost, and enhancing the convenience.

Figure 3:
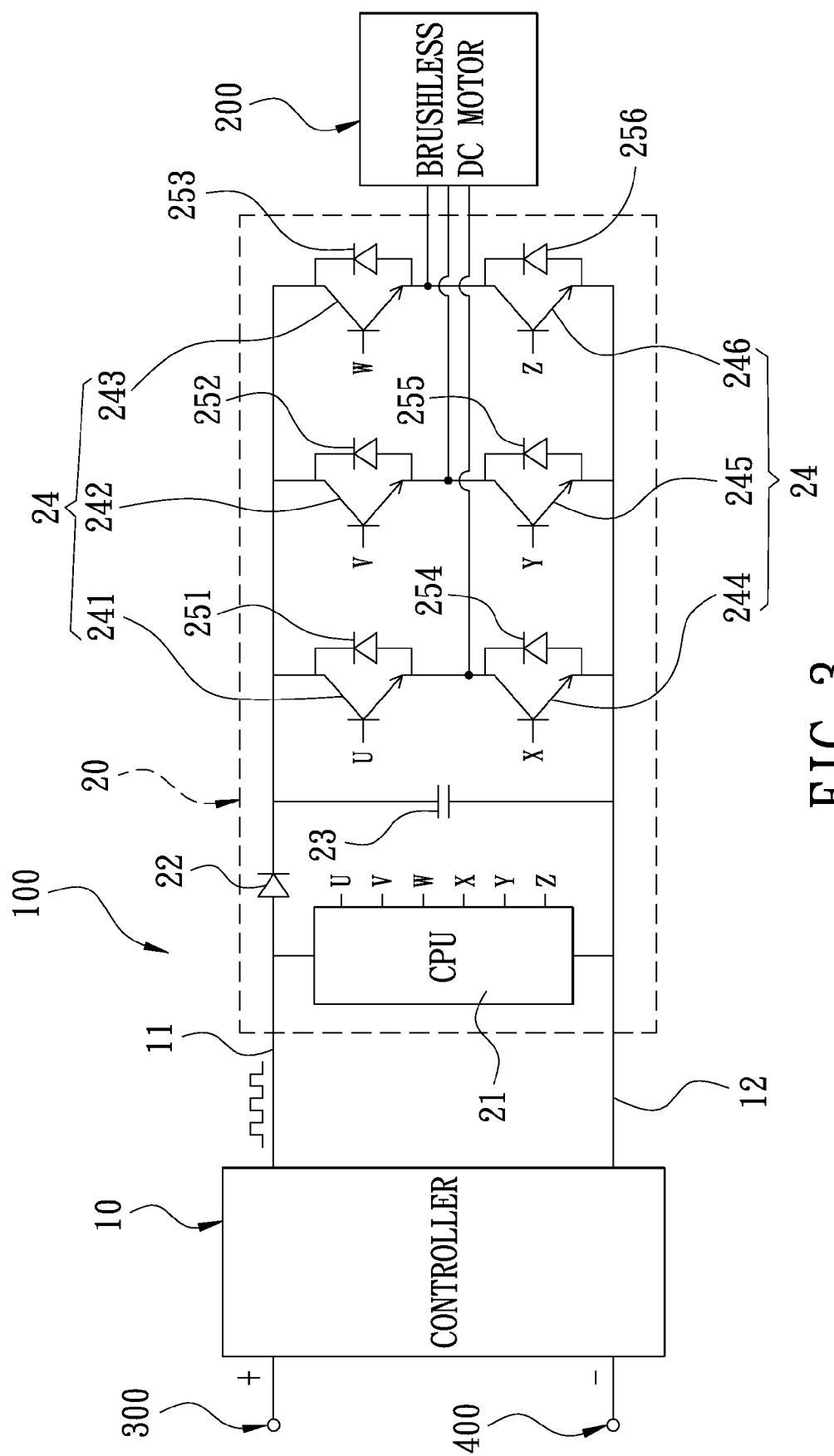
FIG. 3 is a block diagram showing a circuit of a second preferred embodiment of the present invention.

Referring to FIG. 3, a block diagram of a circuit of a second preferred embodiment of the present invention is shown. The difference between the second preferred embodiment and the first preferred embodiment is that the driver 20 preferably includes a W-transistor 243 and a Z-transistor 246 which are disposed between the unidirectional diode 22 and the brushless DC motor 200. The unidirectional diode 22 is series connected to the W-transistor 243. The W-transistor 243 is parallel connected to a W-unidirectional diode 253 and then series connected to the brushless DC motor 200. The Z-transistor 246 is connected to the brushless DC motor 200 and parallel connected to a Z-unidirectional diode 256, whereby the brushless motor device 100 controlled by a carrier of DC positive and negative power wires applies the CPU 21 to select appropriate circuit parameters and operates the transistors 24, thereby controlling the rotating mode of the brushless DC motor 200 via three phases.

Figure 4:
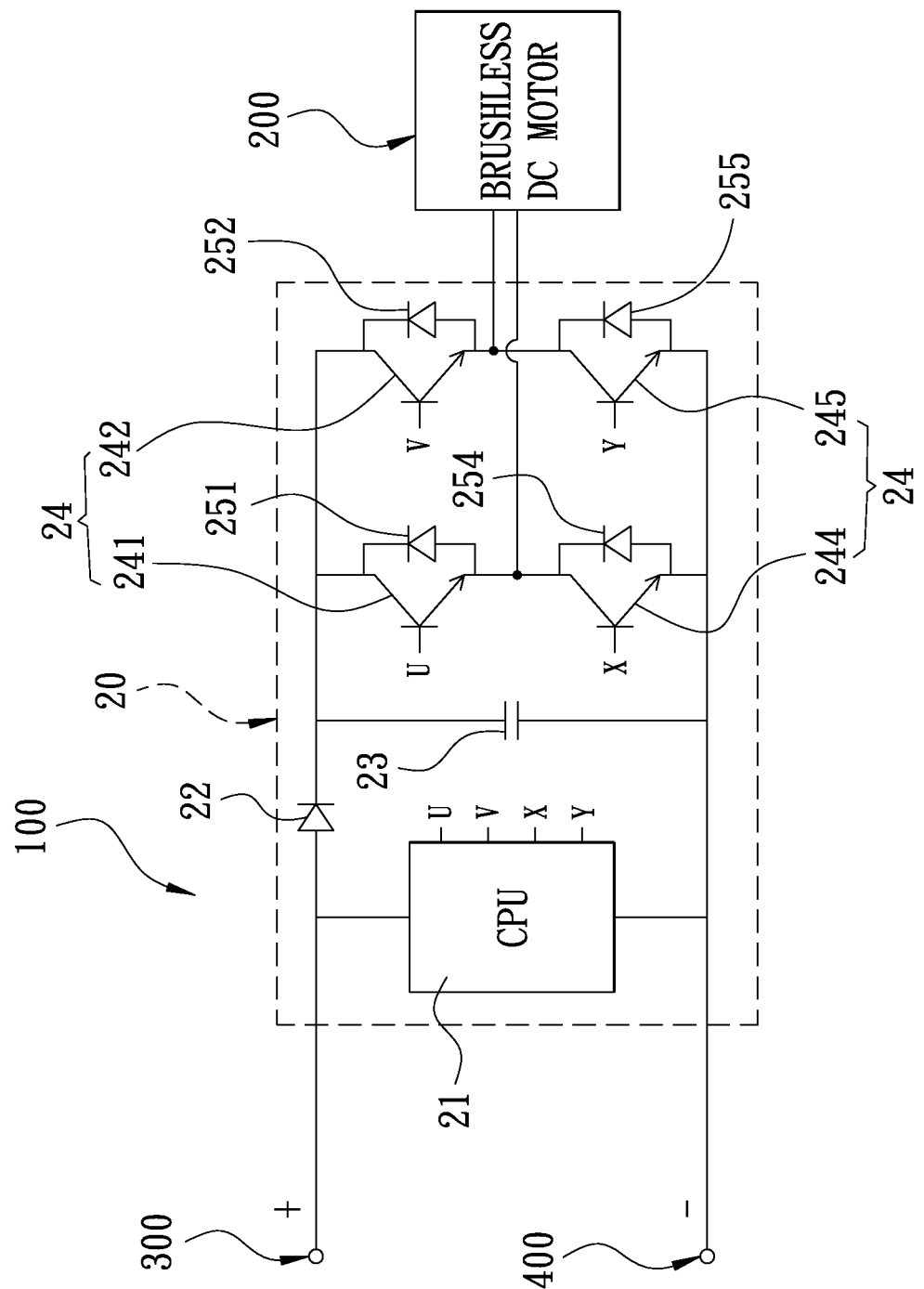
FIG. 4 is a block diagram showing a circuit of a third preferred embodiment of the present invention.

Referring to FIG. 4, a block diagram of a circuit of a third preferred embodiment of the present invention is shown. The difference between the third preferred embodiment and the first preferred embodiment is that the driver 20 is integrated with the brushless DC motor 200 and electrically connected to the DC power. The driver 20 applies the setting function of the CPU 21 thereof to preset the rotating mode of the brushless DC motor 200 thereby controlling the rotating mode of the brushless DC motor 200, and the controller can be omitted. Moreover, the driver 20 is preferably externally connected to a controller and outputs a carrier signal via the controller. After the CPU 21 receives the carrier signal, the carrier signal is saved and memorized in order to control the rotating mode of the brushless DC motor 200. Thereafter, the controller can be removed and the CPU 21 with the saving and memorizing functions can be applied to control the rotating mode of the brushless DC motor 200.

In addition, the brushless motor device 100 controlled by a carrier of DC positive and negative DC power wires only includes two wires, the positive DC wire 11 and the negative DC wire 12, and omits a third wire, which conforms to the safety certification.

We claim:

1. A brushless motor device controlled by a carrier of DC positive and negative power wires comprising:
   a controller electrically connected to a DC power;
   said controller outputting a positive DC wire for outputting a positive DC voltage and a negative DC wire for outputting a negative DC voltage;
   one of said positive DC voltage and said negative DC voltage has a carrier signal;
   a driver electrically connected to said controller;
   said driver receiving said carrier signal and controlling a rotating mode of a brushless DC motor according to said carrier signal;
   said driver includes a CPU;
   said CPU is electrically connected to said positive DC voltage and said negative DC voltage;
   said CPU receives said carrier signal and controls said rotating mode of said brushless DC motor;
   said driver includes a unidirectional diode; and
   said unidirectional diode is disposed between said carrier signal and said brushless DC motor in order to interfere a counter-electromotive force generated from said brushless DC motor and allow said CPU to receive said carrier signal.

2. The brushless motor device controlled by a carrier of DC positive and negative power wires as claimed in claim 1, wherein said CPU receives or saves and memorizes said carrier signal for setting said rotating mode of said brushless DC motor and electrically connecting said driver to said DC power.

3. The brushless motor device controlled by a carrier of DC positive and negative power wires as claimed in claim 1, said unidirectional diode is disposed between said CPU and said brushless DC motor in order to interfere a counter-electromotive force generated from said brushless DC motor and allow said CPU to receive said carrier signal.

* * * * *